(No Model.) 2 Sheets—Sheet 1.
H. C. SERGEANT.
VALVE GEAR FOR DIRECT ACTION ENGINES.
No. 520,190. Patented May 22, 1894.
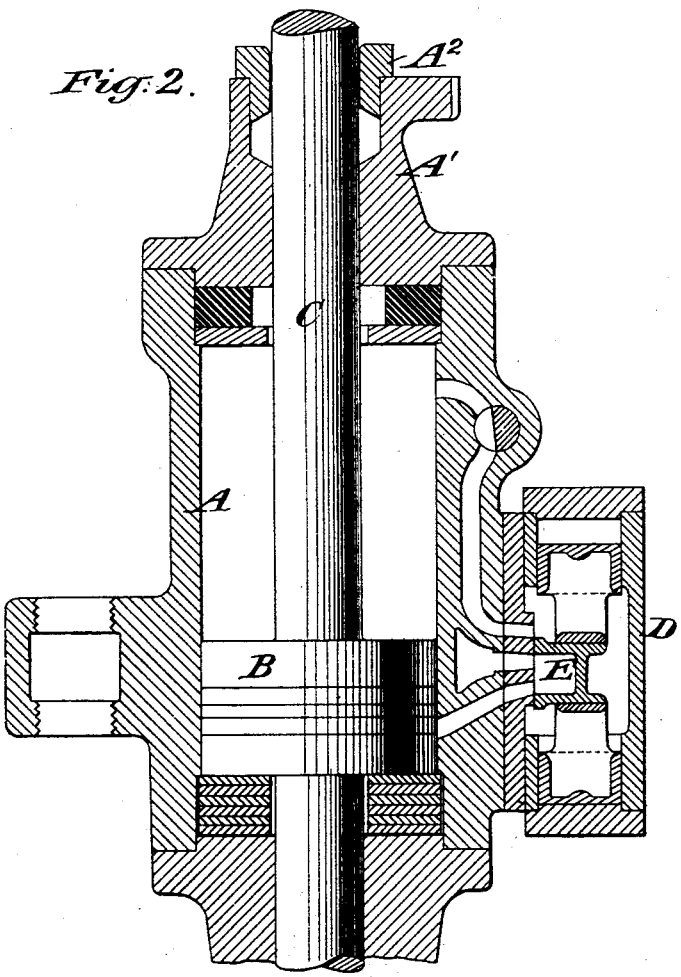
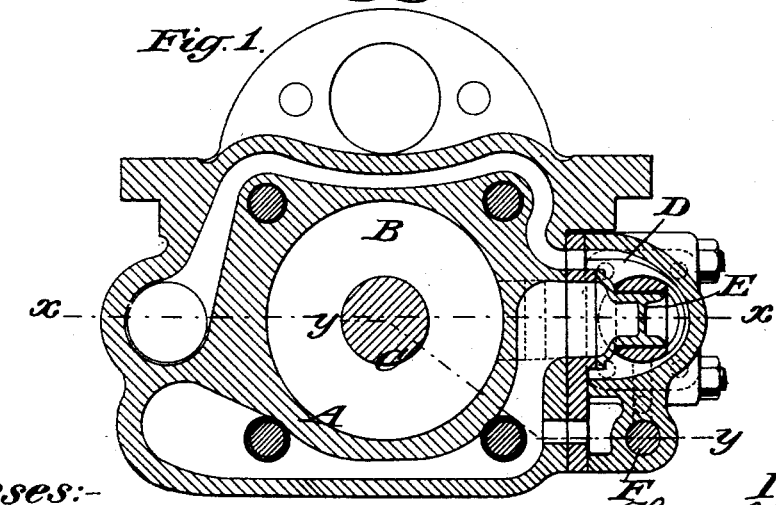
Witnesses:—
George Barry.
O. E. Sundgren.
Inventor.
Henry C. Sergeant
by attorney

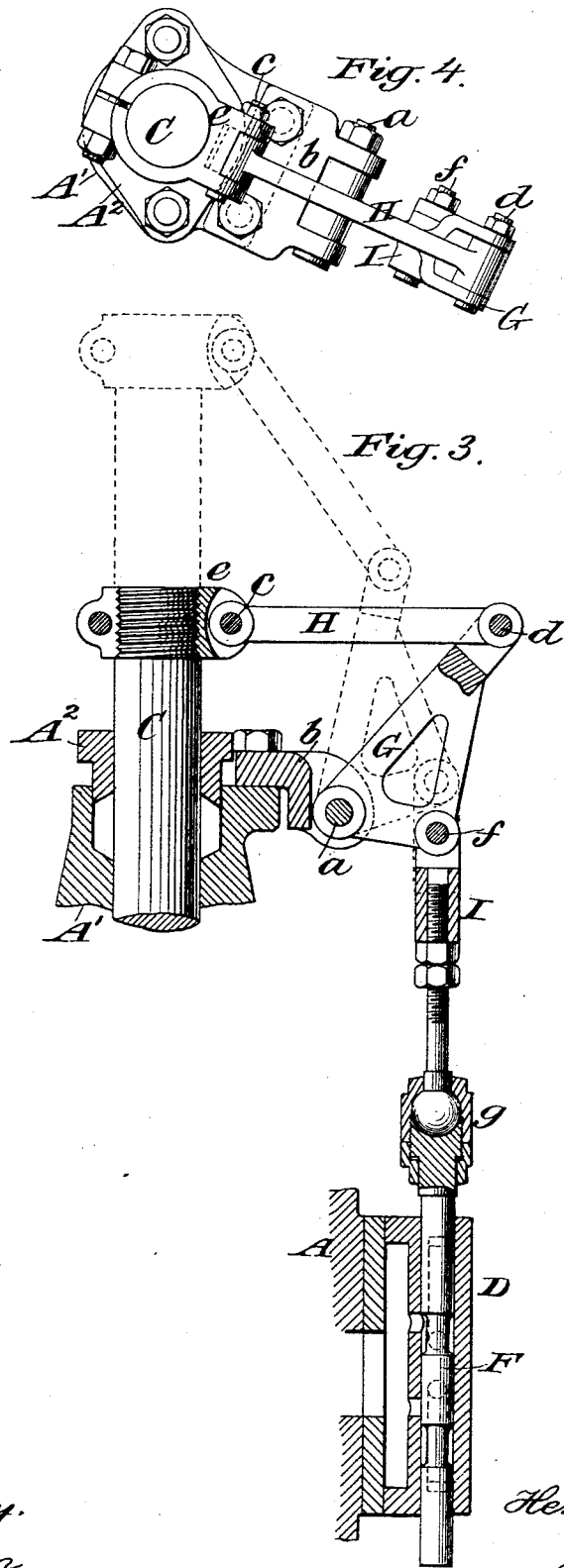

UNITED STATES PATENT OFFICE.

HENRY C. SERGEANT, OF WESTFIELD, NEW JERSEY, ASSIGNOR TO THE INGERSOLL-SERGEANT DRILL COMPANY, OF NEW YORK, N. Y.

VALVE-GEAR FOR DIRECT-ACTION ENGINES.

SPECIFICATION forming part of Letters Patent No. 520,190, dated May 22, 1894.

Application filed July 8, 1893. Serial No. 479,935. (No model.)

*To all whom it may concern:*

Be it known that I, HENRY C. SERGEANT, of Westfield, in the county of Union and State of New Jersey, have invented a new and useful Improvement in Valve-Gears for Direct-Action Engines, of which the following is a specification.

This invention is intended for use on engines to be actuated by air, steam or other fluid under pressure, in which an auxiliary valve actuated by direct connection with the engine is made to control a main valve which is actuated directly by the same motive fluid as the engine itself. The said improvement is intended more especially for use in stone channeling machines. In such a machine the jar which takes place when the heavy gang of drills attached to the piston-rod of the engine strikes its blow is so very severe that the valve gear heretofore employed has been extremely liable to breakage or derangement.

The object of the present invention is to obtain a valve gear for such engines which will be not only effective but more durable than those heretofore employed.

The nature of the improvement will be described with reference to the accompanying drawings and its novelty set forth in the claim.

Figure 1 represents a horizontal section of the cylinder and valves of a channeling machine to which my improved valve gear is applicable. Fig. 2 represents a vertical sectional view taken in the line $x\,x$ Fig. 1. Fig. 3 represents an elevation partly in section on the line $y\,y$ Fig. 1, showing the auxiliary valve, the end of the piston-rod and the valve gear. Fig. 4 is a plan view of the piston-rod and valve gear.

Similar letters of reference designate corresponding parts in all the figures.

A is the engine cylinder.

B is the piston, and C is the piston-rod working through a stuffing-box $A^2$ in the cylinder head $A'$.

D is the valve-chest containing the main valve E and the auxiliary valve F. These valves and their passages may be, as represented, such as are well known and therefore need no description here further than to say that the auxiliary valve should be as represented arranged to have a reciprocating rectilinear motion parallel with that of the engine piston.

The valve gear consists of a bell-crank G and two short connecting rods H and I. The bell-crank G is pivoted on a pivot $a$ which is affixed to the cylinder head by a lug plate $b$. One arm of the said bell-crank is connected by the connecting rod H and its pivotal connections $c\,d$ with a clamp $e$ which is secured on the upper end of the piston-rod. The other arm of the bell-crank is connected by the rod I with the upper end or stem of the auxiliary valve F. The said rod I is made of two parts with an extensible connection to provide for the "setting" of the valve, the connection of the said rod with the bell-crank being by a simple pivot $f$ and its connection with the valve stem being by a ball and socket joint $g$. The arrangement of the connections is such that when the piston-rod C is at the lower end of its stroke, the rod H between the said rod C and the bell-crank is at right angles to the piston-rod and hence that the valve will always move in the same direction as the piston-rod, the valve being at the lower end of its stroke when the piston-rod is at the corresponding end of its stroke and the drill strikes the blow. The whole movement of the valve gear then takes place above the position it assumes at the time of striking the blow as will be understood by reference to the two positions, viz: at the lower and upper ends of the stroke in which the valve gear is represented in Fig. 3 in full lines and in dotted lines respectively. The importance of the movement so taking place and of the rod H coming to the horizontal position at the time of striking is that at that time when the jar takes place all the parts of the valve gear have been gradually brought to a position of rest and the jar has not the same tendency to break or derange them as if they were in motion at that time.

What I claim as my invention is—

The combination with the piston-rod and the auxiliary valve of a direct-action engine, of a bell-crank and a pivotal support for the same affixed to the engine, a pivotal connection between the bell-crank and the auxiliary valve, and a rod pivotally connected at one end with the bell-crank and at the other end with the piston-rod, the said support and pivotal connections being so arranged that the said rod is substantially at right angles to the piston-rod while the piston is at the end of its stroke in one direction, as herein set forth.

HENRY C. SERGEANT.

Witnesses:
FREDK. HAYNES,
ROBERT B. SEWARD.